United States Patent
Grassia et al.

(10) Patent No.: US 7,737,977 B2
(45) Date of Patent: Jun. 15, 2010

(54) TECHNIQUES FOR AUTOMATICALLY MAINTAINING CONTINUITY ACROSS DISCRETE ANIMATION CHANGES

(75) Inventors: Frank Sebastian Grassia, Mountain View, CA (US); Thomas Hahn, Piedmont, CA (US); Malcolm Blanchard, Glen Ellen, CA (US); Marco Jorge da Silva, Oakland, CA (US); Andrew Witkin, Oakland, CA (US)

(73) Assignee: Pixar, Emeryville, CA (US)

( * ) Notice: Subject to any disclaimer, the term of this patent is extended or adjusted under 35 U.S.C. 154(b) by 0 days.

(21) Appl. No.: 10/846,495

(22) Filed: May 14, 2004

(65) Prior Publication Data

US 2005/0253847 A1    Nov. 17, 2005

(51) Int. Cl.
G06T 13/00 (2006.01)
(52) U.S. Cl. .................................................. 345/473
(58) Field of Classification Search .................. None
See application file for complete search history.

(56) References Cited

U.S. PATENT DOCUMENTS

| | | | |
|---|---|---|---|
| 4,952,051 A | 8/1990 | Lovell et al. | |
| 5,252,953 A | 10/1993 | Sandrew et al. | |
| 5,877,778 A | 3/1999 | Dow et al. | |
| 5,982,389 A * | 11/1999 | Guenter et al. | 345/474 |
| 5,999,194 A | 12/1999 | Brunelle et al. | |
| 2001/0033282 A1 | 10/2001 | Hayama et al. | |
| 2002/0154126 A1 | 10/2002 | Vienneau et al. | |
| 2002/0154133 A1 | 10/2002 | Dery | |
| 2003/0011598 A1 | 1/2003 | Klein | |
| 2003/0128215 A1 | 7/2003 | Kim et al. | |
| 2003/0197702 A1 | 10/2003 | Turner et al. | |
| 2003/0231181 A1 | 12/2003 | Rose, III et al. | |
| 2004/0012592 A1 * | 1/2004 | Lanciault | 345/473 |
| 2004/0012593 A1 * | 1/2004 | Lanciault | 345/473 |
| 2004/0119717 A1 * | 6/2004 | Furumoto et al. | 345/473 |
| 2005/0075849 A1 * | 4/2005 | Maher et al. | 703/2 |

OTHER PUBLICATIONS

Boulic R., Huang Z., Magnenat Thalmann N., Thalmann D., A United Framework for the Motion Manipulation of Articulated Figures with the TRACK System, Proc. 3rd Conf. On CAD/CG, Beijing, pp. 45-50.*
"Notification Concerning Transmittal of International Preliminary Report on Patentability" dated Nov. 23, 2006, in International Application No. PCT/US2004/015388.
International Preliminary Report on Patentability, in International Application No. PCT/US2004/015388.
Written Opinion of the International Searching Authority, in International Application No. PCT/US2004/015388.

* cited by examiner

*Primary Examiner*—Ulka Chauhan
*Assistant Examiner*—Said Broome
(74) *Attorney, Agent, or Firm*—Townsend and Townsend and Crew LLP

(57) ABSTRACT

Techniques for automatically maintaining continuity in animation across discrete animation changes. Smooth animation is achieved without forcing the animator to manually calculate compensation values or introducing extra controls to the models that are animated. Continuity or smoothness of the animation is maintained as varying aspects of the animation change under continued authoring.

20 Claims, 4 Drawing Sheets

TECHNIQUES FOR AUTOMATICALLY MAINTAINING CONTINUITY ACROSS DISCRETE ANIMATION CHANGES

BACKGROUND OF THE INVENTION

The present invention relates to the field of computer-generated imagery (CGI) and animation, and more particularly to techniques for maintaining continuity of animation across discrete animation changes.

Animation tools generally provide animators different sets of tools that enable animators to perform animation. The animator may use the tools to animate various models. A model is generally a collection of geometric primitives, mathematical representations, and other information that is used to describe the shape and behavior of an object. Each model may comprise controls (or articulated variables or "avars") for which values may be specified that pose the model, i.e., position and orient its collection of geometric primitives. An animation is simply providing, for each avar in the model, a value at each instant in time over which the animation is to occur. The set of values for the avars may be stored, e.g., in a database, and is sometimes referred to as the "cue" or "animation cue".

An animator may select a particular set of controls for the animation based upon the model to be animated, the type of animation to be performed, etc. Accordingly, animators frequently need to switch between different sets of controls "on the fly" in the course of an animation. For example, the animator may switch from using a set of controls that enable the animator to specify animation using forward kinematics to a set of controls that enable the animator to specify animation using inverse kinematics, and vice versa. A switch from one set of controls to another introduces a discontinuity in the animation that may cause irregularities in the resultant animation (e.g., cause an object being animated to "jump" in the animation). Such discontinuities (or jumps) in an object's motion are generally unacceptable in film-quality animation.

As part of the animation, animators also have to frequently enable and disable constraints between two or more objects (represented by models) being animated. Each time a constraint is changed, the interpretation of a model's controls (avars) may change; thus resulting in the same continuity problem as described above for switching control sets.

The following scenarios illustrate the manner in which a discontinuity is introduced when two objects (represented by models) are constrained together during the animation. Assume that a scene is being animated where a Man and a Bus (both represented by models) are moving to the right (i.e., in the positive X direction) at time $t_1$ and the Man is chasing the Bus. Then, at time $t_2$, the Man catches the Bus and is subsequently constrained (parented) to the Bus. The animation can thus be considered as comprising two parts: before the objects (i.e., the Man and the Bus) are constrained, and after the objects are constrained.

FIG. 1A depicts the positions of the objects being animated as a function of time. $Pos_B$ represents the world space X position of the Bus and $Pos_M$ represents the world space X position of the Man. FIG. 1B depicts splines representing the X-direction motions of the objects over time. A spline is generally a mathematical function that computes a value at any point in time by interpolating between a sequence of knots, which represent constraints on the function's value at specific points in time. According to an animation technique, animators specify an animation by creating and editing knots. $X_B$ represents the input avar (or control) of the Bus model that specifies the Bus's X position with respect to the Bus's parent's coordinate frame. $X_M$ represents the input avar (or control) of the Man model that specifies the Man's X position with respect to the Man's parent's coordinate frame. As shown, a constraint between the two objects is made at time $t_2$. With respect to his own reference frame (i.e., $X_M$), the Man moves until time $t_2$, and then ceases his own motion ($X_M$ held constant as shown in FIG. 1B) as he is carried by the Bus thereafter. However, as shown in FIG. 1A, this produces a discontinuity in the Man's world space position ($Pos_M$) and causes the Man to "jump off" the Bus at precisely the time that the Man catches the Bus, as the Man's reference frame discontinuously changes from the world reference space to the Bus's reference space. The functions that $Pos_M$ computes change discontinuously due to a change in the reference frame.

Conventionally, animators attempt to solve the discontinuity problem by manually calculating a compensated value for $X_M$ that is required to make the Man "stick" to the Bus, and write that value into the animation cue for $X_M$. Let's assume, without loss of generality, that the manually computed compensation value is zero. FIGS. 2A and 2B represent the effect of the computed compensated value on the animation of the Man and Bus. In this scenario, as depicted in FIGS. 2A and 2B, the Man's motion after time $t_2$ is correct (i.e., it is the same as the Bus's motion). However, the Man's pre-$t_2$ motion of chasing the Bus has been subverted by driving the Man's world space position to zero at $t_2$. As a result, before $t_2$, the Man has a motion of approaching the Bus and then moving away from the Bus, and then magically popping to the Bus at time $t_2$ (after $t_2$, $Pos_M$ is coincident with $Pos_B$).

Other conventional techniques attempt to rectify the above-discussed problems by introducing new animation controls (avars) for each of the models being animated. For example, extra avars are added to each model for each control set switch or constraint addition/deletion. Blending functions also have to be defined that allow an animator to blend motion gradually between otherwise discontinuous states. For example, in the previously described scenario, a new animation control $X_{MB}$ (the X position of the Man relative to the Bus) is defined for the Man and a blending function is defined for a blend interval around the time when the discontinuous change is introduced into the animation cue. The blending function is then used to compute the values of $X_M$ and $X_{MB}$ to enable smooth animation. However, this approach also has several problems associated with it. Although it reduces the "jump" in the animation, the object being animated (e.g., the Man) still moves over the blend interval, and it is up to the animator to manually minimize the amount of motion. Thus, the animator still has to manually finesse the animation across the constraint. These manual adjustments are generally quite complex and as a result quite time consuming. Further, this approach requires the addition of new controls (avars) to models being animated. This imposes a debilitating intellectual and managerial burden on animators.

BRIEF SUMMARY OF THE INVENTION

Embodiments of the present invention provide techniques for automatically maintaining continuity in animation across discrete animation changes. The smooth animation is achieved without forcing the animator to manually calculate compensation values or introducing extra controls to the models that are animated. Continuity or smoothness of the animation is maintained as varying aspects of the animation change under continued authoring.

According to an embodiment of the present invention, techniques are provided for facilitating animation. A discontinuous change in an animation cue for a model is detected. A set of one or more controls of the model that are affected by the detected discontinuous change are determined. A first value is determined for each control in the set of controls, the first value for a control representing a value of the control prior to occurrence of the discontinuous change. A second value is calculated for each control in the set of controls, the second value for a control representing a value for the control after occurrence of the discontinuous change, wherein based upon the second values for the one or more controls in the set of controls a world space position of the model after occurrence of the discontinuous change is same as a world space position of the model before the occurrence of the discontinuous change.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

Embodiments of the present invention provide techniques for automatically maintaining continuity in animation across discrete animation changes. The smooth animation is achieved without forcing the animator to manually calculate compensation values or introducing extra controls to the models that are animated. Continuity or smoothness of the animation is maintained as varying aspects of the animation change under continued authoring.

Figure 1A:
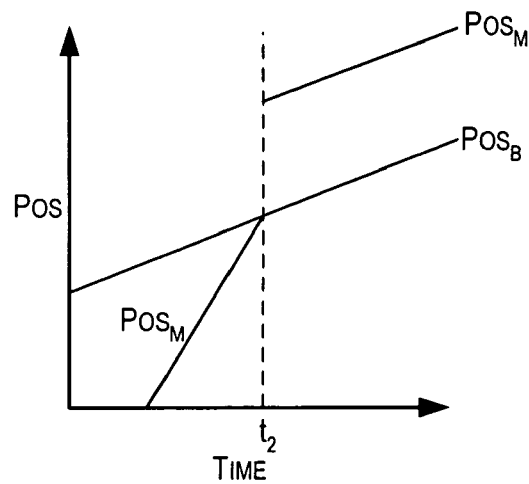
FIG. 1A depicts positions of the objects being animated as a function of time.
Figure 1B:
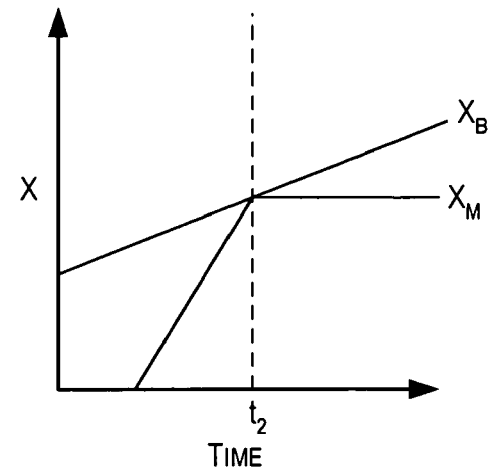
FIG. 1B depicts splines representing the X-direction motions of the objects over time.
Figure 2A:
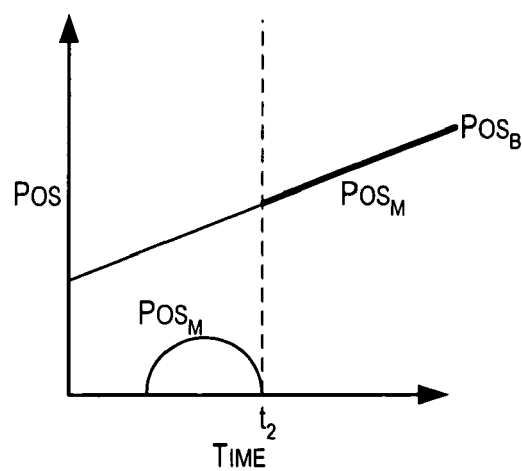
FIG. 2A depicts positions of the objects being animated as a function of time using manually calculated compensation values.
Figure 2B:
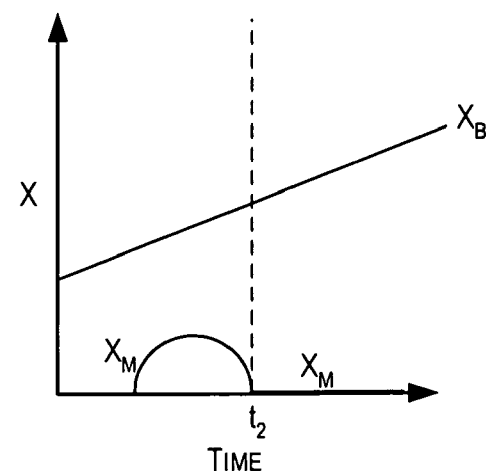
FIG. 2B depicts splines representing the X-direction motions of the objects over time using manually calculated compensation values.
Figure 3:
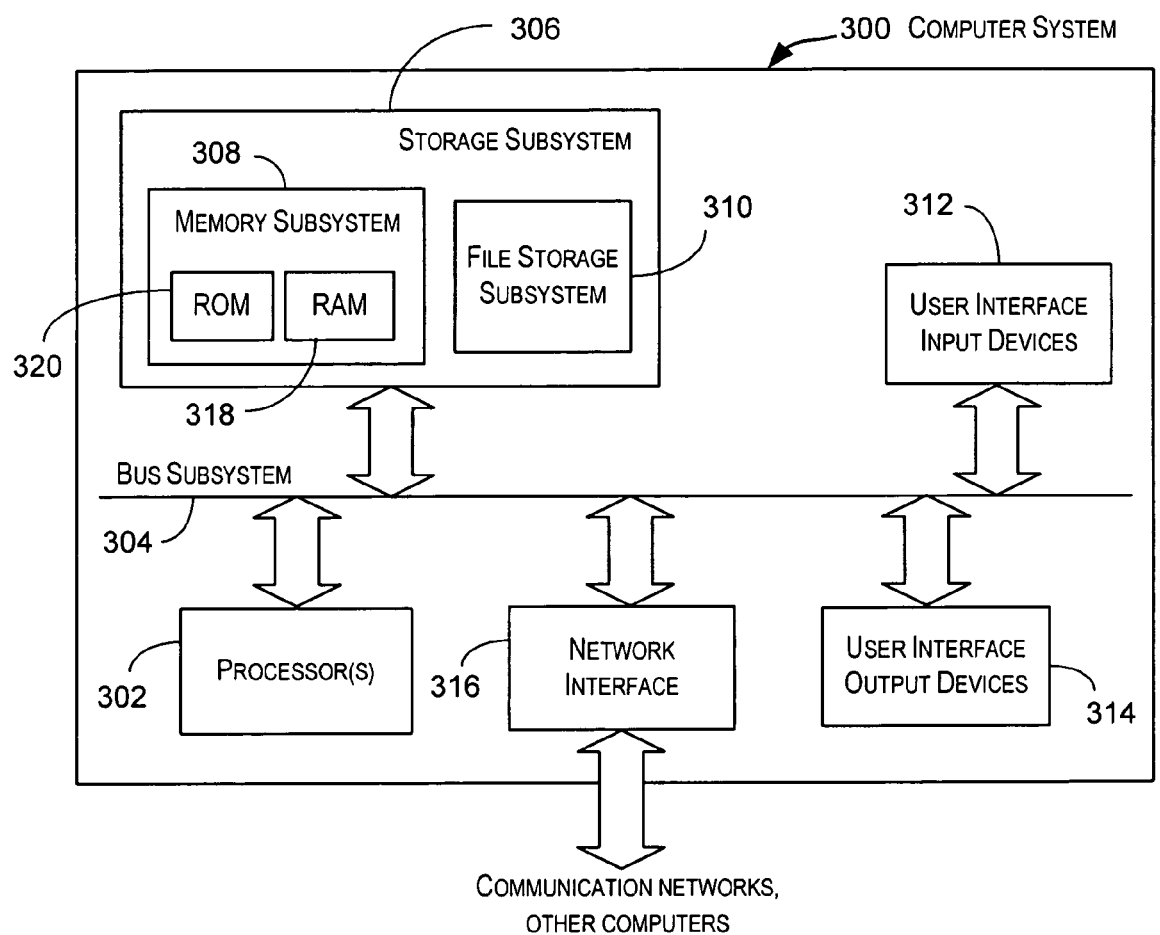
FIG. 3 is a simplified block diagram of a computer system that may be used to practice an embodiment of the present invention.

FIG. 3 is a simplified block diagram of a computer system 300 that may be used to practice an embodiment of the present invention. Computer system 300 may be used by an animator to specify animation. As shown in FIG. 3, computer system 300 includes a processor 302 that communicates with a number of peripheral devices via a bus subsystem 304. These peripheral devices may include a storage subsystem 306, comprising a memory subsystem 308 and a file storage subsystem 310, user interface input devices 312, user interface output devices 314, and a network interface subsystem 316. The input and output devices allow a user, such as the administrator, to interact with computer system 300.

Network interface subsystem 316 provides an interface to other computer systems, and networks. Network interface subsystem 316 serves as an interface for receiving data from other sources and for transmitting data to other sources from computer system 300. Embodiments of network interface subsystem 316 include an Ethernet card, a modem (telephone, satellite, cable, ISDN, etc.), (asynchronous) digital subscriber line (DSL) units, and the like.

User interface input devices 312 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. The animator may use the input devices to interact with and control animation tools and specify values for model controls or avars. In general, use of the term "input device" is intended to include all possible types of devices and mechanisms for inputting information to computer system 300.

User interface output devices 314 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 300.

Storage subsystem 306 may be configured to store the basic programming and data constructs that provide the functionality of the present invention. For example, according to an embodiment of the present invention, software code modules (or instructions) implementing the functionality of the present invention may be stored in storage subsystem 306. These software modules may be executed by processor(s) 302. Storage subsystem 306 may also provide a repository for storing data used in accordance with the present invention. Storage subsystem 306 may comprise memory subsystem 308 and file/disk storage subsystem 310.

Memory subsystem 308 may include a number of memories including a main random access memory (RAM) 318 for storage of instructions and data during program execution and a read only memory (ROM) 320 in which fixed instructions are stored. RAM 318 is generally semiconductor-based memory that can be read and written by processor 302. The storage locations can be accessed in any order. The term RAM is generally understood to refer to volatile memory that can be written to as well as read. There are various different types of RAM.

File storage subsystem 310 provides persistent (non-volatile) storage and caching for program and data files, and may include a hard disk drive, a floppy disk drive along with associated removable media, a Compact Disk Read Only Memory (CD-ROM) drive, an optical drive, removable media cartridges, and other like storage media.

Bus subsystem 304 provides a mechanism for letting the various components and subsystems of computer system 300 communicate with each other as intended. Although bus subsystem 304 is shown schematically as a single bus, alternative embodiments of the bus subsystem may utilize multiple busses.

Computer system 300 can be of various types including a personal computer, a portable computer, a workstation, a network computer, a mainframe, a kiosk, or any other data processing system. Due to the ever-changing nature of computers and networks, the description of computer system 300 depicted in FIG. 3 is intended only as a specific example for purposes of illustrating the preferred embodiment of the computer system. Many other configurations having more or fewer components than the system depicted in FIG. 3 are possible.

Figure 4:
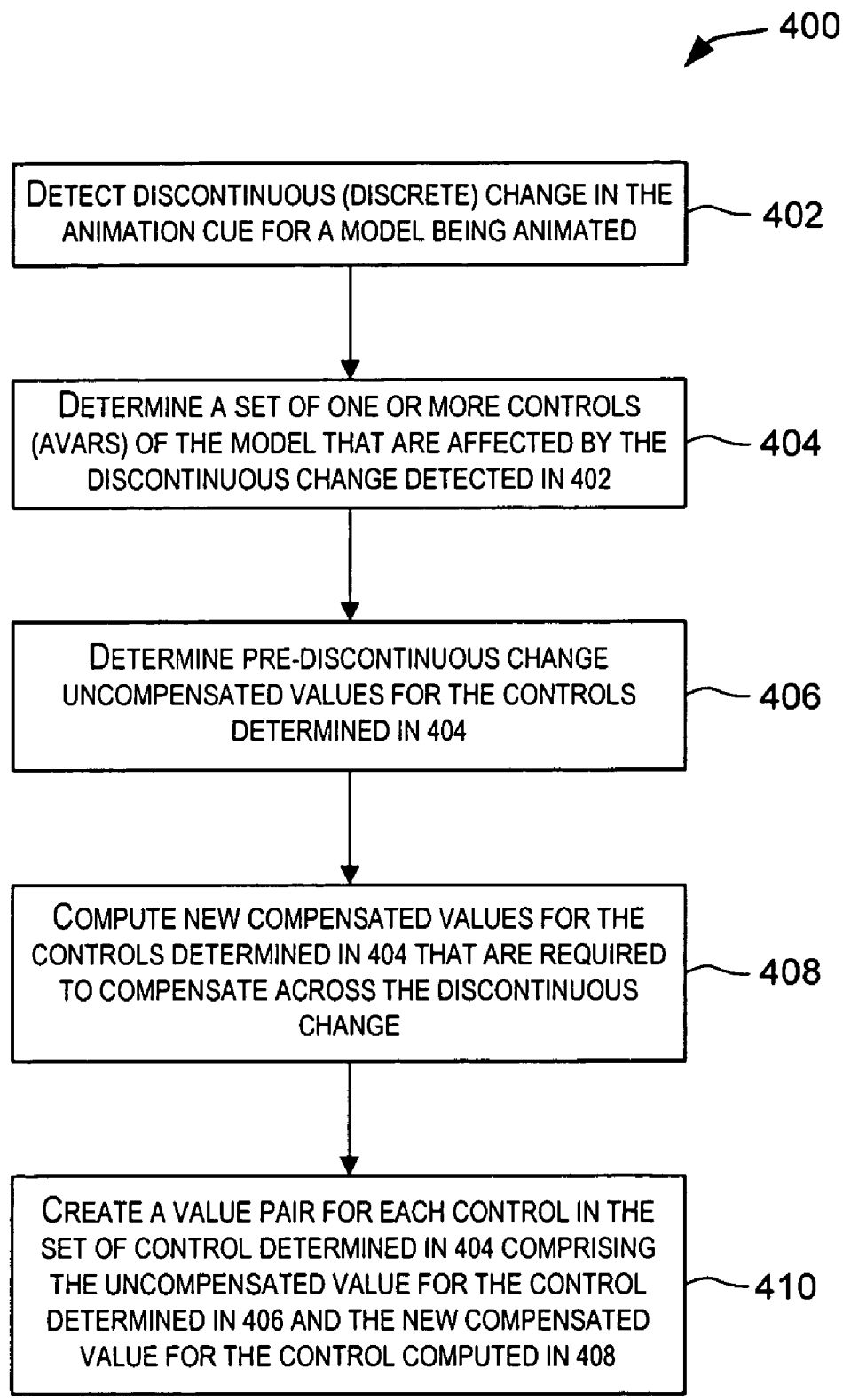
FIG. 4 is a simplified high-level flowchart depicting a method of facilitating smooth animation according to an embodiment of the present invention.

FIG. 4 is a simplified high-level flowchart 400 depicting a method of facilitating smooth animation according to an embodiment of the present invention. The method depicted in FIG. 4 may be performed by software modules executed by a processor, hardware modules, or combinations thereof. Flowchart 400 depicted in FIG. 4 is merely illustrative of an embodiment of the present invention and is not intended to limit the scope of the present invention. Other variations, modifications, and alternatives are also within the scope of the present invention. The method depicted in FIG. 4 may be adapted to work with different implementation constraints.

As depicted in FIG. 4, processing is initiated when a discrete or discontinuous change is detected in the animation cue for a model being animated (step 402). As previously stated, an animation cue provides, for each avar in a model, a value at each instant in time over which the animation is to occur. The discrete or discontinuous change may be introduced in the animation cue due to reparenting of a model, changing a set of animation controls (e.g., changing from forward to inverse animation), turning a constraint on or off, and the like. These activities may be performed by the animator.

A set of one or more controls (avars) of the model that are affected by the discontinuous change detected in 402 are then determined (step 404). As part of 404, the model may be queried for the set of controls of the model that are affected by the discontinuous change.

Uncompensated values (or pre-discontinuous change values) for each control prior to the discontinuous change are then computed for the set of controls determined in 404 (step 406). As part of 406, the model may be queried for the current values of the set of controls determined in 404.

New values (or compensated values) are then automatically computed for the controls in the set of controls that are required to compensate across the discontinuous change (step 408). In general, any discontinuous change detected in 402 will tend to produce an accompanying discontinuity in the world space configuration or position of the model as time in the animation proceeds from "before the change" to "after the change". The compensated values determined in 408 represent values that taken together with the new ("after") value(s) for the controls detected in 402, will specify a world space configuration or position for the affected model(s) that is equivalent to or same as the world space configuration or position before the discontinuous change occurs.

A value pair is then created for each control in the set of controls determined in 404 comprising the uncompensated value for the control determined in 406 and the compensated value for the control computed in 408 (step 410). The value pair for each control comprises a first value (or left hand-side value) that is the uncompensated value of the control prior to the discontinuous change (determined in 406) and a second value (or right hand-side value) that is the compensated value computed for the control in 408 after the discontinuous change. For example, if a discontinuous change due to enabling a constraint is made at time $t_2$, then the first value of the value pair represents the value of the control of the model before $t_2$ and the second value of the value pair represents the compensated value for the control determined in 406 for time $t_2$ onwards.

As stated earlier, a spline is generally a mathematical function that computes a value at any point in time by interpolating between a sequence of knots, which represent constraints on the function's value at specific points in time. According to an animation technique, animators specify an animation by creating and editing knots. In one embodiment, the value pair may also be referred to as a "dual-valued knot". The dual-valued knot for a control represents a knot that is introduced in the spline representing the articulated value of the control variable. The dual-valued knot comprises two values: a left hand-side value (or first value) that is the uncompensated value of the control prior to the discontinuous change and a right hand-side value (or second value) that is the new compensated value computed for the control.

When any subsequent change to values in the animation cue affects the world space configuration of affected models on only one side of the discontinuous change (i.e., to animation before the occurrence of the discontinuous change or to animation after the occurrence of the discontinuous change), embodiments of the present invention automatically re-compensate, storing the updated values in the other side of dual-valued knots (or equivalent) in the cue. If it is the "before" animation that is changing, new right hand-side values for the value pairs are recomputed by performing compensation based upon the values in the left hand-side of the value pairs. If it is the "after" animation that is changing, new left hand-side values of the value pairs are recomputed by performing compensation based on the right hand-side values of the value pairs. The compensation is performed automatically without requiring addition of additional controls to the models or manual calculation of blending functions or compensating values by the animator. Embodiments of the present invention are able to automatically maintain continuity/smoothness as varying aspects of the animation change under continued authoring. Alternative embodiments of the present invention may provide explicit mechanisms that enable an animator to take explicit control over when the re-compensation is applied, when automatic continuity maintenance is undesirable.

The features of the present invention may be applied to the previously described Man and Bus scenario to produce smooth animation. As before, let us assume that a scene is being animated where a Man and a Bus (both represented by models) are moving to the right (a positive change in the X direction) at time $t_1$ and the Man is chasing the bus. Then, at time $t_2$, the Man catches the Bus and is subsequently constrained (parented) to the Bus. Thus, the animation can be considered as comprising two parts: before the objects (i.e., the Man and the Bus) are constrained, and after the objects are constrained. Let $Pos_B$ represent the world space X position of the Bus and $Pos_M$ represents the world space X position of the Man. $X_B$ represents the input avar (or control) of the Bus model that specifies the Bus's X position with respect to the Bus's parent's coordinate frame. $X_M$ represents the input avar (or control) of the Man model that specifies the Man's X position with respect to the Man's parent's coordinate frame.

Figure 5A:
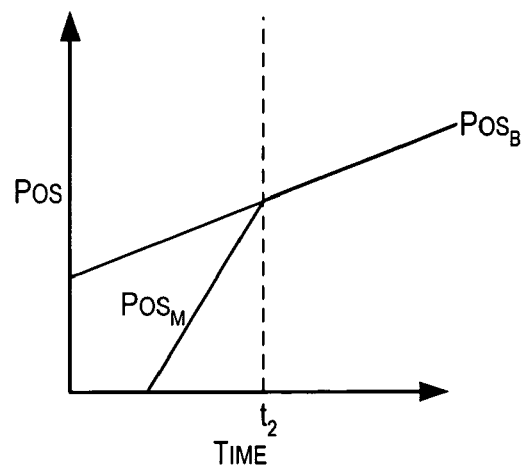
FIG. 5A depicts the X-direction positions of objects over time according to an embodiment of the present invention.
Figure 5B:
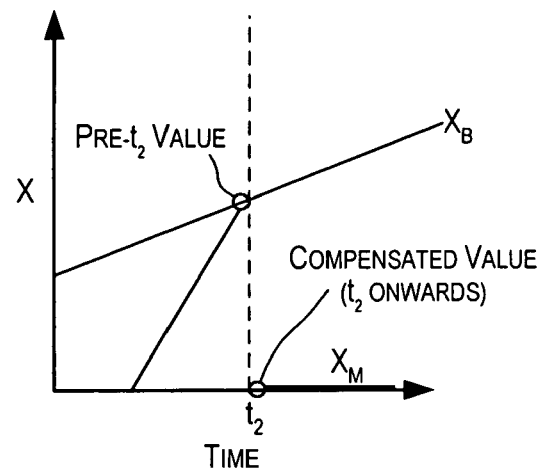
FIG. 5B depicts splines representing the values of controls of models according to an embodiment of the present invention.

FIG. 5A depicts the X-direction positions of the Man and the Bus over time according to an embodiment of the present invention. FIG. 5B depicts splines representing the values of controls (avars) $X_B$ of the Bus and $X_M$ of the Man according to an embodiment of the present invention. As shown, time $t_2$ onwards, the position of the Man is the same as the position of the Bus (i.e., $Pos_M$ is coincident with $Pos_B$ from $t_2$ onwards as depicted in FIG. 5A). According to an embodiment of the present invention, at time $t_2$, a compensated value for control $X_M$ of Man that is required to make the Man stick to the Bus is automatically computed. A dual-valued knot is inserted into $X_M$ in the cue, whose left hand side is the uncompensated value (represented by the circle to the left of $t_2$ in FIG. 5B), and whose right hand side is the compensated value (represented by the circle at $t_2$ in FIG. 5B). By introducing a discontinuity into $X_M$ at $t_2$, the continuity of the final animation ($Pos_M$) is preserved (as depicted in FIG. 5A, wherein $t_2$ onwards, the position of the Man is the same as the position of the Bus).

As shown above, embodiments of the present invention automatically alter the animation cue to produce smooth motion over a discontinuous change to one or more discrete parameters. This is done by introducing discontinuous changes to other continuous parameters. According to an embodiment of the present invention, a value pair or dual-valued knot is inserted into existing control parameters to effect discontinuous changes in otherwise continuous values. The value pair or dual-valued knot possesses a first value representing the uncompensated value of the control before the discontinuous change and a second compensated value at the time of the discontinuous change. Smooth animation is enabled without requiring addition of new controls to the models, or requiring the animator to manually calculate the compensated values.

The discrete or discontinuous changes may be introduced in the animation cue due to various factors. For example, discrete or discontinuous changes may be introduced upon reparenting of a model, changing a set of animation controls, turning a constraint on or off, and the like. For example, a discrete change may be introduced when an animator switches from using a set of controls that enable the animator to specify animation using forward kinematics to a set of controls that enable the animator to specify animation using inverse kinematics, and vice versa. As is well known in the CGI art, forward kinematics and inverse kinematics are techniques for specifying motion of objects. An articulated model being animated may comprise of a series of parts (or links) connected at joints. In forward kinematics, the motion of the joints is specified explicitly by the animator. The motion of an end effector (e.g., a hand or foot in the case of a figure model) is determined indirectly as the accumulation of all transformations that lead to the end effector, as the tree or hierarchy of the model structure is descended. In inverse kinematics, on the other hand, the animator defines the position of the end effectors only. Inverse kinematics solves for the position and the orientation of all the joints in the link hierarchy that lead to the end effector.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software (e.g., software code modules, instructions), it should be recognized that other combinations of hardware and software are also within the scope of the present invention. The present invention may be implemented only in hardware, or only in software, or using combinations thereof. For example, the processing performed by the present invention, as described above, may be implemented in hardware chips, graphics boards or accelerators, etc.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A computer-implemented method of facilitating animation, the method comprising:

analyzing, with a processor of a computer system, an animation cue configured to produce a continuous input over time to controls associated with a model for a discontinuous change;

determining, with the processor of the computer system, a set of one or more controls of the model that is affected by the discontinuous change, output from each control in the set of one or more controls that is affected by the discontinuous change being discontinuous at an identified time in response to the continuous input;

determining, with the processor of the computer system, a first value at the identified time for each control in the set of one or more controls that is affected by the discontinuous change, the first value for a control that is affected by the discontinuous change representing a value of the control prior to occurrence of the discontinuous change;

determining, with the processor of the computer system, a second value at the identified time for each control in the set of controls that is affected by the discontinuous change, the second value for a control that is affected by the discontinuous change representing a value of the control after occurrence of the discontinuous change that compensates across the discontinuous change to produce an output from the control that remains continuous at the identified time; and inserting, with the processor of the computer system, one or more discontinuities into the animation cue at the identified time based on the second value for each control in the set of controls that is affected by the discontinuous change that configure the animation cue to produce a discontinuous input to the controls associated with the model that maintains a world space position of the model after occurrence of the discontinuous change the same as a world space position of the model before occurrence of the discontinuous change.

2. The method of claim 1 further comprising:

storing, in a storage device associated with the computer system, a value pair for each control in the set of controls that is affected by the discontinuous change, the value pair for a control that is affected by the detected discontinuous change comprising the first value determined for the control and the second value determined for the control; and wherein inserting, with the processor of the computer system, the one or more discontinuities into the animation cue comprises inserting the value pair for each control in the set of controls that is affected by the discontinuous change into the animation cue.

3. The method of claim 1 wherein the discontinuous change results from constraining the model to another model.

4. The method of claim 1 wherein the discontinuous change results from deleting a constraint of the model to another model.

5. The method of claim 1 wherein the discontinuous change results from switching from a first set of controls to a second set of controls for animating the model.

6. The method of claim 5 wherein the first set of controls comprises controls for animating the model using forward kinematics and the second set of controls comprises controls for animating the model using inverse kinematics.

7. The method of claim 5 wherein the first set of controls comprises controls for animating the model using inverse kinematics and the second set of controls comprises controls for animating the model using forward kinematics.

8. The method of claim 1 further comprising:
receiving, at the processor of the computer system, information indicative of a change in the animation cue for the model before the occurrence of the discontinuous change; and
determining, with the processor of the computer system, an updated second value at the identified time for each control in the set of controls that is affected by the change that compensates for the change to produce an output from the control that remains continuous at the identified time.

9. The method of claim 1 further comprising:
receiving, at the processor of the computer system, information indicative of a change in the animation cue for the model after the occurrence of the discontinuous change; and
determining, with the processor of the computer system, an updated first value at the identified time for each control in the set of controls that is affected by the change that compensates for the change to produce an output from the control that remains continuous at the identified time.

10. A computer-readable storage medium storing a computer program product executable by one or more computer systems for facilitating animation, the computer-readable storage medium comprising:
code for analyzing an animation cue configured to produce a continuous input over time to controls associated with a model for a discontinuous change;
code for determining a set of one or more controls of the model that is affected by the discontinuous change, output from each control in the set of one or more controls that is affected by the discontinuous change being discontinuous at an identified time in response to the continuous input;
code for determining a first value at the identified time for each control in the set of controls that is affected by the discontinuous change, the first value for a control that is affected by the discontinuous change representing a value of the control prior to occurrence of the discontinuous change;
code for determining a second value at the identified time for each control in the set of controls that is affected by the discontinuous change, the second value for a control that is affected by the discontinuous change representing a value of the control after occurrence of the discontinuous change that compensates across the discontinuous change to produce an output from the control that remains continuous at the identified time; and
code for inserting one or more discontinuities into the animation cue at the identified time based on the second value for each control in the set of controls that is affected by the discontinuous change that configure the animation cue to produce a discontinuous input to the controls associated with the model that maintains a world space position of the model after occurrence of the discontinuous change the same as a world space position of the model before occurrence of the discontinuous change.

11. The computer-readable storage medium of claim 10 further comprising:
code for storing a value pair for each control in the set of controls that is affected by the discontinuous change, the value pair for a control that is affected by the discontinuous change comprising the first value determined for the control and the second value determined for the control; and
wherein the code for inserting the one or more discontinuities into the animation cue comprises code for interesting the value pair for each control in the set of controls that is affected by the discontinuous change into the animation cue.

12. The computer-readable storage medium of claim 10 wherein the discontinuous change results from constraining the model to another model.

13. The computer-readable storage medium of claim 10 wherein the discontinuous change results from deleting a constraint of the model to another model.

14. The computer-readable storage medium of claim 10 wherein the discontinuous change results from switching from a first set of controls to a second set of controls for animating the model.

15. The computer-readable storage medium of claim 14 wherein the first set of controls comprises controls for animating the model using forward kinematics and the second set of controls comprises controls for animating the model using inverse kinematics.

16. The computer-readable storage medium of claim 14 wherein the first set of controls comprises controls for animating the model using inverse kinematics and the second set of controls comprises controls for animating the model using forward kinematics.

17. The computer-readable storage medium of claim 10 further comprising:
code for receiving information indicative of a change in the animation cue for the model before the occurrence of the discontinuous change; and
code for determining an updated second value at the identified time for each control in the set of controls of the model that is affected by the change that compensates for the change to produce an output from the control that remains continuous at the identified time.

18. The computer-readable storage medium of claim 10 further comprising:
code for receiving information indicative of a change in the animation cue for the model after the occurrence of the discontinuous change; and
code for determining an updated first value at the identified time for each control in the set of controls that is affected by the change that compensates for the change to produce an output from the control that remains continuous at the identified time.

19. An apparatus including a processor and a memory for facilitating animation, the apparatus comprising:
means for analyzing an animation cue configured to produce a continuous input over time to controls associated with a model for a discontinuous change;
means for determining a set of one or more controls of the model that is affected by the discontinuous change, output from each control in the set of one or more controls that is affected by the discontinuous change being discontinuous at an identified time in response to the continuous input;
means for determining a first value at the identified time for each control in the set of controls that is affected by the discontinuous change, the first value for a control that is affected by the discontinuous change representing a value of the control prior to occurrence of the discontinuous change; and means for determining a second value at the identified time for each control in the set of controls that is affected by the discontinuous change, the second value for a control that is affected by the discontinuous change representing a value of the control after occurrence of the discontinuous change that compensates across the discontinuous change to produce an output from the control that remains continuous at the identified time; and means for inserting one or more discontinuities into the animation cue at the identified time based on the second value for each control in the set of controls that is affected by the discontinuous change that configure the animation cue to produce a discontinuous input to the controls associated with the model that maintains a world space position of the model after occurrence of the discontinuous change the same as a world space position of the model before occurrence of the discontinuous change.

20. A system for facilitating animation, the system comprising:

a processor; and a memory coupled to the processor, the memory configured to store instructions executable by the processor, the memory storing a set of one or more instructions that when executed by the processor cause the processor to:

analyze an animation cue configured to produce a continuous input over time to controls associated with a model for a discontinuous change;

determine a set of one or more controls of the model that is affected by the discontinuous change, output from each control in the set of one or more controls that is affected by the discontinuous change being discontinuous at an identified time in response to the continuous input;

determine a first value at the identified time for each control in the set of controls that is affected by the discontinuous change, the first value for a control that is affected by the discontinuous change representing a value of the control prior to occurrence of the discontinuous change; and determine a second value at the identified time for each control in the set of controls that is affected by the discontinuous change, the second value for a control that is affected by the discontinuous change representing a value of the control after occurrence of the discontinuous change that compensates across the discontinuous change to produce an output from the control that remains continuous at the identified time; and insert one or more discontinuities into the animation cue at the identified time based on the second value for each control in the set of controls that is affected by the discontinuous change that configure the animation cue to produce a discontinuous input to the controls associated with the model that maintains a world space position of the model after occurrence of the discontinuous change the same as a world space position of the model before occurrence of the discontinuous change.

* * * * *